US007064810B2

(12) United States Patent
Anderson et al.

(10) Patent No.: US 7,064,810 B2
(45) Date of Patent: Jun. 20, 2006

(54) OPTICAL RANGE FINDER WITH DIRECTED ATTENTION

(75) Inventors: Noel Wayne Anderson, Fargo, ND (US); Robert George Thackray, Fargo, ND (US)

(73) Assignee: Deere & Company, Moline, IL (US)

( * ) Notice: Subject to any disclaimer, the term of this patent is extended or adjusted under 35 U.S.C. 154(b) by 274 days.

(21) Appl. No.: 10/662,867

(22) Filed: Sep. 15, 2003

(65) Prior Publication Data

US 2005/0057741 A1 Mar. 17, 2005

(51) Int. Cl.
*G01C 3/08* (2006.01)
*G01C 3/00* (2006.01)

(52) U.S. Cl. .................. 356/5.01; 356/5.02; 356/5.03; 356/5.1

(58) Field of Classification Search ................ 356/5.01
See application file for complete search history.

(56) References Cited

U.S. PATENT DOCUMENTS

| | | | |
|---|---|---|---|
| 3,942,890 A * | 3/1976 | Malone ...................... 356/5.03 |
| 4,572,625 A | 2/1986 | Arndt et al. ................. 350/541 |
| 4,573,773 A | 3/1986 | Arndt et al. ................. 350/541 |
| 4,690,550 A | 9/1987 | Kühne ............................ 356/5 |
| 5,022,723 A | 6/1991 | Schmidt et al. .............. 350/1.2 |
| 5,061,049 A | 10/1991 | Hornbeck .................... 359/224 |
| 5,220,164 A * | 6/1993 | Lieber et al. .......... 250/214 VT |
| 5,600,478 A | 2/1997 | Stevens ....................... 359/223 |
| 5,638,164 A * | 6/1997 | Landau ....................... 356/5.01 |
| 5,780,839 A * | 7/1998 | Livingston ................ 250/203.2 |
| 5,870,176 A | 2/1999 | Sweatt et al. .................. 355/53 |
| 5,933,183 A | 8/1999 | Enomoto et al. ............. 347/241 |
| 5,939,706 A * | 8/1999 | Livingston ............... 250/203.1 |
| 5,966,230 A | 10/1999 | Swartz et al. ............... 359/196 |
| 6,031,605 A | 2/2000 | Olbertz .................... 356/141.4 |
| 6,040,909 A * | 3/2000 | Hasegawa et al. .......... 356/614 |
| 6,059,188 A | 5/2000 | diFazio et al. ......... 235/462.36 |
| 6,069,727 A | 5/2000 | Cho et al. ................... 359/226 |
| 6,188,500 B1 | 2/2001 | Rudeen et al. .............. 359/196 |
| 6,244,024 B1 | 6/2001 | Diekhans et al. ......... 56/10.2 F |

(Continued)

FOREIGN PATENT DOCUMENTS

DE 19608632 9/1997

(Continued)

OTHER PUBLICATIONS

Products Overview, Laser Measurement Systems-Outdoor [online] sick [retrieved on Nov. 30, 2001] Retrieved from the Internet: <URL: http://www.sick.de/english/products/dat_products.asp?bannerback=0>.

(Continued)

*Primary Examiner*—Thomas H. Tarcza
*Assistant Examiner*—Luke Ratcliffe (57) ABSTRACT

An optical range finder for determining the distance comprises a focusing optical member that focuses emitted electromagnetic radiation upon a micro-mirror array. A processor controls the micro-mirror array to direct the focused electromagnetic radiation into a defined radiation pattern consistent with a lower resolution scan over a greater area and a higher resolution scan over a lesser area of interest within the greater area. A transmission optical member focuses the defined radiation pattern toward an object. A reception optical member receives electromagnetic radiation reflected from the object. A detector detects the receipt of the reflected electromagnetic radiation. A timer determines an elapsed time, between transmission of the electromagnetic radiation to the object and receipt of the electromagnetic radiation from the object, to facilitate determination of the distance between the object and the range finder.

19 Claims, 5 Drawing Sheets

U.S. PATENT DOCUMENTS

| | | | |
|---|---|---|---|
| 6,359,718 B1 | 3/2002 | Lin et al. ................... | 359/224 |
| 6,509,973 B1* | 1/2003 | Kiyoi et al. ................ | 356/606 |
| 6,611,225 B1* | 8/2003 | Mitsumoto et al. ........... | 342/70 |
| 6,611,617 B1* | 8/2003 | Crampton .................. | 382/154 |
| 6,674,534 B1* | 1/2004 | Norita et al. ............... | 356/601 |
| 2002/0036779 A1* | 3/2002 | Kiyoi et al. ................ | 356/606 |
| 2003/0035097 A1* | 2/2003 | Lai et al. .................... | 356/5.01 |
| 2003/0090646 A1 | 5/2003 | Riegl et al. .................... | 356/3 |
| 2003/0123045 A1 | 7/2003 | Riegl et al. ................ | 356/4.01 |

FOREIGN PATENT DOCUMENTS

| | | | |
|---|---|---|---|
| EP | 1221582 A3 | 7/2002 | |
| EP | 1310764 A3 | 5/2003 | |
| EP | 1321777 A3 | 6/2003 | |

OTHER PUBLICATIONS

Freudenrich, C.C. "How Projection Television Works" [online] [retrieved on Jan. 29, 2002]. Retrieved from the Internet: <URL: http://www.howstuffworks.com/projection-tv4.html>.

Riegl USA Scanners & Rangefinders for Surveying, Altimetry and other applications [online] Riegl USA [retrieved on Nov. 30, 2001]. Retrieved from the Internet: <URL: http://www.rieglusa.com/LMS-Z210.html>.

Nestor Arana-Arejolaleibe, Maurice Briot, Christian Ganibal, Alexandre Nketsa, and Roland Prajoux; Entitled: A 3D Micro-Sensor Integrating Control and Data Processing in an FPGA-Based Calculator.

Anagnostopoulos G.P., Wagner B, Papageorgas P.G., Hofmann U., Maroulis D., and Theofanous N.G.; Entitled: The Electronics of a Control System for Micromirrors in a Laser-Scanning Device; University of Athens, Department of Informatics and Telecommunications, Panepistimiopolis, and Fraunhofer Institute of Silicon Technology.

Mark Ollis and Anthony Stentz; Entitled: First results in vision-based crop line tracking; Robotics Institute, Carnegie Mellon University.

A.R. Jimenez, A.K. Jain, R. Ceres, and J.L. Pons; Entitled: Automatic fruit recognition: a survey and new results using Range/Attenuation images.

N. Arana-Arejolaleiba, F. Lerasle, M. Briot, C. Lernaire, and J.B. Hayet; Entitled: A Smart Sensor based Visual Landmarks Detection for Indoor Robot Navigation.

Paul B. Ruffin; Entitled: Optical MEMS-Based Arrays; U.S. Army Aviation and Missile Command.

Y. Fainman, E. Botvinick, J. Price, and D. Gough; Entitled: 3-D Quantitative Imaging of the Microvasculature with the Texas Instruments Digital Micromirror Device; Department of Electrical and Computer Engineering, University of California at San Diego.

* cited by examiner

OPTICAL RANGE FINDER WITH DIRECTED ATTENTION

FIELD OF THE INVENTION

This invention relates to an optical range finder with directed attention.

BACKGROUND OF THE INVENTION

A range finder means an instrument or device used to determine the distance of an object from a reference point. In the prior art, a laser range finder may use a rotating mirror assembly to direct a beam transmitted from the laser range finder. A laser measurement system of the prior art may include a mechanically operated mirror, which scans through a certain requisite range of motion to reach a desired setting or angular position. Because such mechanical scanners must typically scan through a certain range of motion to reach a desired steering of a laser or light beam, the practical response time of the mechanical laser scanner is greater than desired for certain applications, such as vehicular control. To improve the scan rate of the mechanical scanner, a laser source may be reflected from a multi-sided rotating mirror or prism to produce a broad angular field of view of the laser source over a region. However, the rotating mirror arrangement is costly to manufacture and susceptible to mechanical failure, such as shock or vibration cracking the mirror or misaligning it.

If the laser range finder is exposed to dust or other particulate matter in an agricultural environment, the range of motion of the laser range finder may be impeded and performance may be degraded. Vibration of the laser range finder may lead to mechanical failure of one or more joints in a rotating mirror assembly of the prior art laser range finder. Further, the mechanical components of a rotating mirror assembly are limited to a practical minimum size by manufacturing constraints and cost. The size of the rotating mirror assembly may be too large to accommodate a desired housing size for a laser range finder. Accordingly, a need exists for a laser range finder with one or more of the following characteristics: rapid or real-time responsiveness suitable for dynamic vehicular control, a compact housing, resistance to dust and other particulate matter, and reliability despite exposure to vibration.

SUMMARY OF THE INVENTION

An optical range finder for determining the distance of an object may comprise an optical source of electromagnetic radiation. A focusing optical member focuses the electromagnetic radiation upon a micro-mirror array. A data processor controls the micro-mirror array to direct the focused electromagnetic radiation in a defined direction or a defined radiation pattern. A beam adjuster determines a transmitted beam size (e.g., beam width) of the defined radiation pattern in a spatial region of interest to provide a desired level of resolution for that spatial region. A transmission optical member focuses the defined radiation pattern toward an object. A reception optical member receives electromagnetic radiation reflected from the object or within a field of interest. A detector detects the receipt of the reflected electromagnetic radiation. A timer determines an elapsed time between transmission of the electromagnetic radiation to the object and receipt of the electromagnetic radiation from any object within the field of view that is sufficiently reflective and of adequate minimal size to provide return electromagnetic radiation of sufficient strength. A data processor converts the elapsed time into a distance between the object and a reference point.

DESCRIPTION OF THE PREFERRED EMBODIMENT

Figure 1:
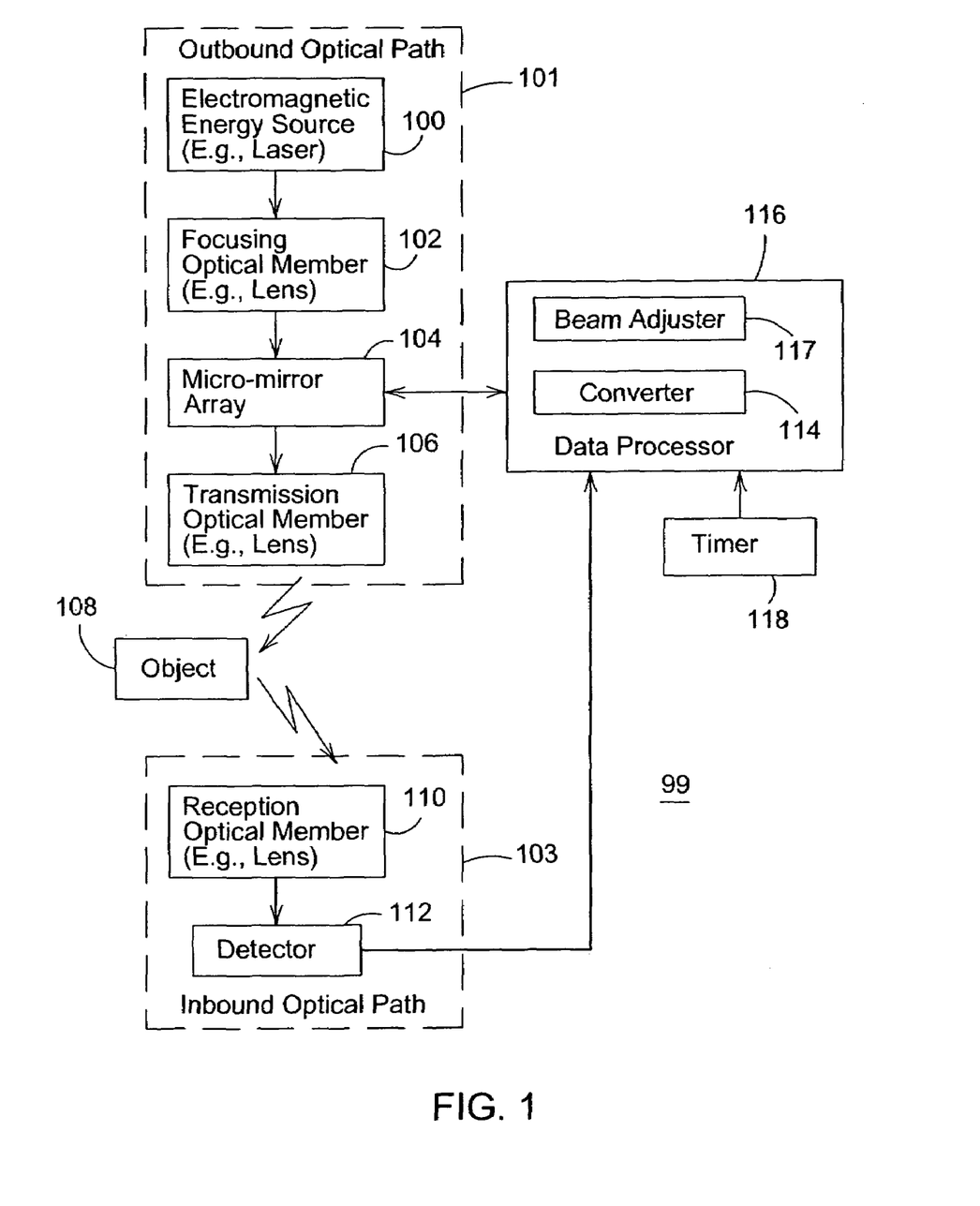
FIG. 1 is a block diagram of one embodiment of an optical range finder for estimating or determining a distance of an object from a reference point.

FIG. 1 shows a block diagram of an optical range finder 99 for determining the distance of an object 108 from a reference point. The reference point may be defined with reference to the range finder 99 or a portion thereof. The optical range finder 99 comprises an outbound optical path 101 and an inbound optical path 103. The outbound optical path 101 is associated with an electromagnetic signal (e.g., a pulse or pulse train) transmitted from the range finder 99 toward an object 108, whereas the inbound optical path 103 is associated with the reflected electromagnetic signal received by the range finder 99. The outbound optical path 101 comprises an electromagnetic energy source 100, a focusing optical member 102, a micro-mirror array 104, and a transmission optical member 106. The inbound optical path 103 comprises a reception optical member 110 and a detector 112.

The optical range finder 99 comprises an electromagnetic energy source 100 (e.g., a laser) that emits electromagnetic radiation toward a focusing optical member 102 (e.g., a lens). The electromagnetic radiation may be an infrared beam, near infra-red, ultraviolet, red light, a visual spectrum beam or another light beam.

The focusing optical member 102 focuses the electromagnetic radiation upon a micro-mirror array 104. The focusing member 102 may expand the beam or form the beam into a linear beam. A data processor 116 controls the micro-mirror array 104 to direct the focused electromagnetic radiation (e.g., linear beam) in a defined direction or a defined radiation pattern. A transmission optical member 106 focuses the defined radiation pattern toward an object 108.

A reception optical member 110 is arranged to receive electromagnetic radiation reflected from the object 108. A detector 112 detects the receipt of the reflected electromagnetic radiation. The receipt of the reflected radiation pattern is associated with a reception time. For example, the detector 112 generates a detection signal proportional to the intensity of the received beam reflection. A timer 118 determines an elapsed time between a transmission time of a transmission of the electromagnetic radiation (e.g., an identifiable or traceable pulse) to the object 108 and a reception time of the receipt of the electromagnetic radiation (e.g., an identifiable or traceable pulse) from the object 108. The elapsed time between when the beam leaves the finder 99 and when it returns to the finder 99 is used to determine the distance between the finder 99 and the object 108. A data processor 116 converts the elapsed time into a distance between the object 108 and a reference point, such as the range finder. If the beam generates multiple returns by striking multiple objects, the elapsed time may be selected as the arrival of the first return, the last return, the strongest return, an average or median of multiple returns, a mode of multiple returns, or as consistent with a suitable, reliable propagation model or other statistical model. The distance (D) in meters to the object 108 or another point of the reflection is equal to the elapsed time (T) in seconds, divided by two and multiplied by the speed of light (C) in meters per second. That is, D=TC/2.

In one embodiment, the electromagnetic energy source 100 transmits one or more pulses (e.g., identifiable or traceable pulse) of electromagnetic radiation and a timer 118 registers a transmission time. In another embodiment, the electromagnetic energy source 100 may output various frequencies or frequency ranges of visible light to facilitate determination of the color of an object 108 based on the presence or absence of reflected energy from the object with respect to transmitted frequency from the finder. In yet another embodiment, the electromagnetic energy source 100 comprises a laser with an output power that is considered safe for human exposure in accordance with applicable technical and or regulatory standards (e.g., U.S. and international standards; Federal Communication Commission rules or regulations).

In one embodiment, the micro-mirror array 104 comprises a micro-electromechanical device that supports the output of a randomly accessible beam position or alignment and a variable beam size. For example, a micro-mirror array may comprise a micro-electromechanical system (MEMS), a compliant micro-electromechanical system (CMEMS) or another device.

The micro-mirror array 104 comprises arrays of reflective members (e.g., mirrors) associated with a substrate (e.g., a semiconductor substrate). Reflective members may be energized individually, collectively, or in sequence, or any combination of the foregoing, to scan over a desired area (e.g., field of view). Each reflective member may be energized via one or more capacitive plates or conductive members to deform, and hence, steer the reflective member to direct the electromagnetic radiation (e.g., light beam). More than one reflective member may reflect the electromagnetic radiation (e.g., the light beam) at one time, resulting in a larger beam than if just a single reflective member reflected the electromagnetic radiation (e.g., beam).

A beam adjuster 117 controls the micro-mirror array 104 to have a controlled radiation pattern. For example, the controlled radiation pattern comprises at least one of the following: first pattern for scanning a field of view, a second pattern for covering a sample of the field of view, and a third pattern for covering a sub-area of the field of view. The beam adjuster 117 determines a beam width or beam size of the defined radiation pattern. Accordingly, the output beam size, intensity or both may be dynamically adjusted for scanning an area of interest (e.g., a global area of interest or local area of interest). Further, the range finder 99 can provide fine tuning of a scan path (e.g., a scan line) or greater resolution scan path by changing a fraction of the asserted reflective members comprising the beam. The beam adjuster 117 can adjust the beam dynamically without any limitation from the rotation rate of a multi-sided mechanical mirror of prior art systems.

In one embodiment, elastomers are added between the reflective member and the substrate of the micro-mirror array 104 to decrease the response time from deformation to rest after the energy is removed from a member. The elastomer associated with the reflective elements may be used to improve the range of motion of the reflective elements, which in turn, improves the angular scan range. The elastomer associated with the reflective elements may lower the energy or voltage needed to control the micro-mirror array 104. Micro-mirror arrays 104 may be fabricated by semiconductor and integrated circuit fabrication techniques. Features of micro-mirror arrays may be constructed of one or more of the following: silicon, silicon oxide, silicon nitride, aluminum, silver, and nickel.

The tilt or movement of the reflective members are controlled by electrostatic charges applied to electrodes. Semiconductor switches, such as complementary metal oxide semiconductor (CMOS) transistors, may be used to control the position of the reflective members by electrostatic deflection and sense the position of the reflective members by capacitive sensing. The capacitive sensing of the position of the reflective members provides feedback for fine-tuning of the preferential alignment of the reflective members and electrical energy required to attain such alignment. The beam adjuster 117 may accept input from capacitive sensing and may operate semiconductor switches or a driver to control the electrostatic charges applied to the electrodes.

The micro-mirror array 104 supports activation of different reflective elements in virtually any sequence (e.g., a random sequence) to achieve a desired position of the reflective elements, rather than scanning through in a particular sequence of motion to reach a desired position or angular title of a mirror, as might be required with mechanical laser scanners. Accordingly, the micro-mirror array 104 supports dynamic, "random access" to mirror positioning for structured light. The micro-mirror array 104 may provide data on a region or area of interest in terms of coordinates, intensity, and distance.

A driver may be interposed between the beam adjuster 117 and the micro-mirror array 104 to provide an electronic interface between the beam adjuster 117 and micro-mirror array 104. The beam adjuster 117 may establish a scanning pattern or energization pattern for applying electrical energy to one or more selected reflective elements of the micro-mirror array 104. For example, a micro-mirror array 104 may be energized to project a linear arrangement of pixels or other patterns of structured light. The driver or beam adjuster may activate each successive member of the micro-mirror array 104 prior to the time the member is actually required to minimize the delay associated with activating and moving the member of the micro-mirror array 104. That is, the temporal offset between energy activation of successive members is minimized, which reduces the response time of the micro-mirror array 104. The micro-mirror array 104 provides random access to mirror positioning to produce fixed structured light.

The beam adjuster 117 energizes the micro-mirror array 104 to provide pulses of light or emissions, where time of flight is measured from a reflective obstacle or another object 108. The micro-mirror array 104 supports great flexibility and efficiency in image data collection. For example, a first beam with a lower resolution gathers a smaller set of scanned image data points (e.g., first scan data) than a second beam with a greater resolution. The reflection received by reception of the optical member 110 from the first beam can be used to identify where objects 108 of potential interest lie. The reflection received by the reception of the optical member 110 from a second beam at higher scan resolution can then be used to gather high density data limited to the local regions of interest. There can be significant data collection efficiency improvements (e.g., time saving) by doing the course resolution scan of the first beam followed by a high resolution scan of the second beam, rather than taking high resolution scan of the whole scene and then processing the voluminous data from the high resolution scan of the whole scene (e.g., global area of interest) to extract information in the areas of interest. In one embodiment, the whole scene represents a crop edge and the local area of interest represents a gap or break in the crop edge (e.g., from stunted plant growth or a previously harvested area). Here, the local region of interest is identified by one or more discontinuities in the reflectivity of the whole scene or crop edge or discontinuities with respect to certain frequencies of transmitted light.

Figure 2:
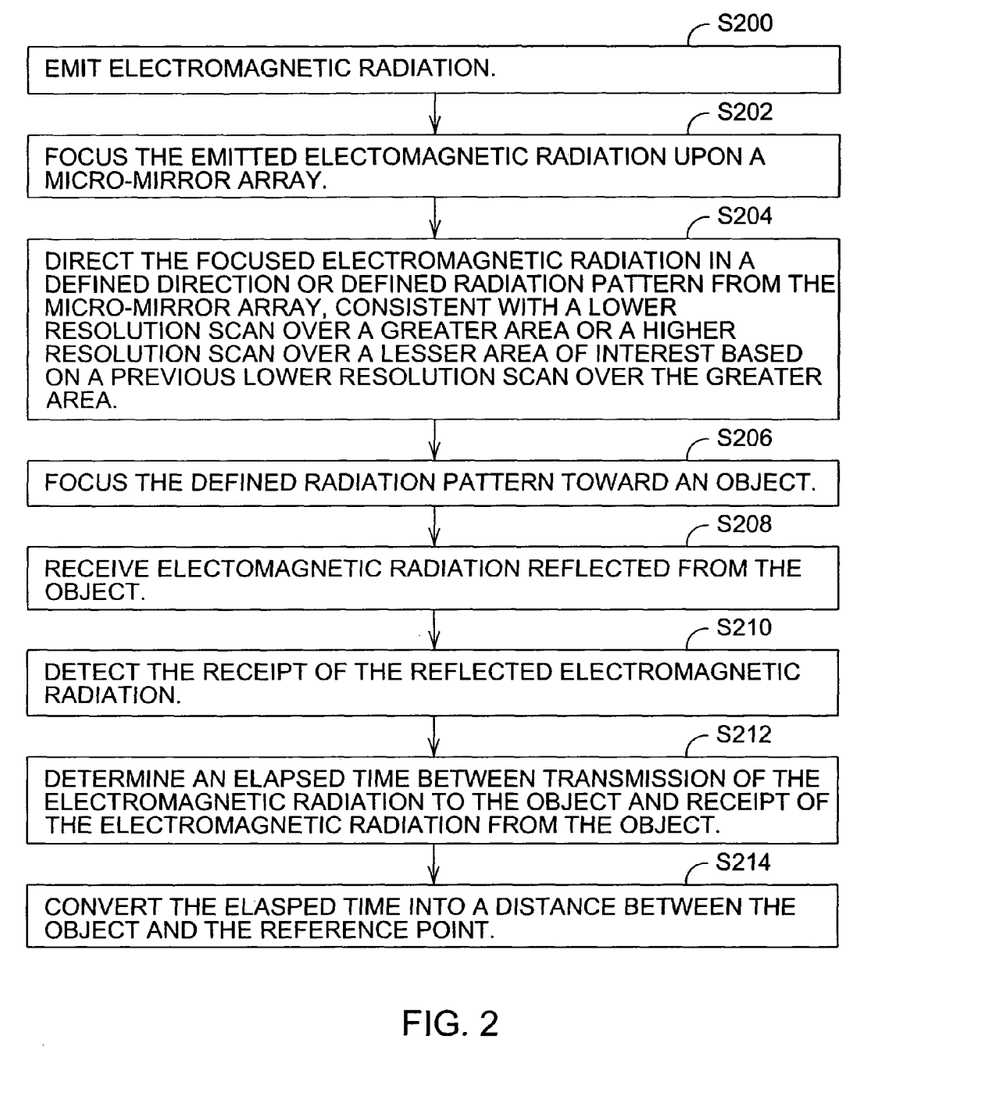
FIG. 2 is a method for determining a distance or range of an object from a reference point.

FIG. 2 is a flow chart of a method for determining a distance of an object 108 from a reference point. The method of FIG. 2 begins in step S200.

In step S200, an electromagnetic energy source 100 emits electromagnetic radiation (e.g., a light beam). A timer 118 may record the time associated with the transmission of an identifiable pulse of electromagnetic radiation from the range finder 99.

In step S202, a focusing optical member 102 focuses the electromagnetic radiation upon a micro-mirror array 104. In one example, a lens, as the focusing optical member 102, may focus the electromagnetic radiation upon the micro-mirror array 104. In another example, a diffraction grating, as the optical member, focuses the electromagnetic energy upon the micro-mirror array 104.

In step S204, the micro-mirror array 104 directs the focused electromagnetic radiation in a defined direction or defined radiation pattern toward an object 108 (e.g., a plant, obstacle, crop, crop edge or stubble), consistent with a lower resolution scan over a greater area or a higher resolution scan over a lesser area of interest based on a previous lower resolution scan over the greater area.

In step S206, the transmission optical member 106 focuses the defined radiation pattern toward an object 108. For example, a transmission lens, as a transmission optical member 106, focuses the defined radiation pattern.

In step S208, a reception optical member 110 is arranged to receive electromagnetic radiation (e.g., a light beam) reflected from the object 108, if the object is of sufficient physical size and reflectivity. For example, a reception lens, as the reception optical member 110, receives electromagnetic radiation reflected from the object 108 and focuses the received electromagnetic radiation on a detector 112. In one illustrative example, the received electromagnetic radiation may be filtered or applied to a filter prior to striking the detector 112 to reject or pass certain frequencies of the electromagnetic radiation received. Filtering may be used to detect the presence of objects 108 having certain colors.

In step S210, a detector 112 detects the receipt of the reflected, received electromagnetic radiation. The electromagnetic radiation may be reflected from the object. For example, the detector 112 may represent a charge-coupled device, an cadmium sulfide sensor, a complementary metal oxide semiconductor or another sensor that emits an electrical signal when electromagnetic energy, such as light, is incident upon the sensor. The electrical signal emitted may be used to determine a time of arrival or reception time associated with an identifiable pulse. The timer 118 may record a reception time or a time of arrival associated with the reception of an identifiable pulse or modulated signal of electromagnetic radiation. The transmission time and reception time of the identifiable pulse or modulated signal may be measured with respect to each other or a reference time frame.

In step S212, a data processor 116 determines an elapsed time between a transmission time of the electromagnetic radiation to the object 108 and a reception time of receipt of the electromagnetic radiation from the object 108.

In step S214, a data processor 116 or a converter 114 converts the elapsed time into a distance between the object 108 and the reference point. The distance between the object 108 and the reference point may be used as an input to a guidance system of a work vehicle. Work vehicles include, but are not limited to, agricultural machines such as combines, harvesters, and tractors; construction equipment; forestry equipment, such as harvesters and forwards; and turf care equipment, such as mowers; and off-road utility vehicles. The distance may be determined in accordance with the following equation: $D=TC/2$, where D is the distance in meters to the object, T is the elapsed time in seconds divided by two and multiplied by the speed of light C in meters per second.

Figure 3:
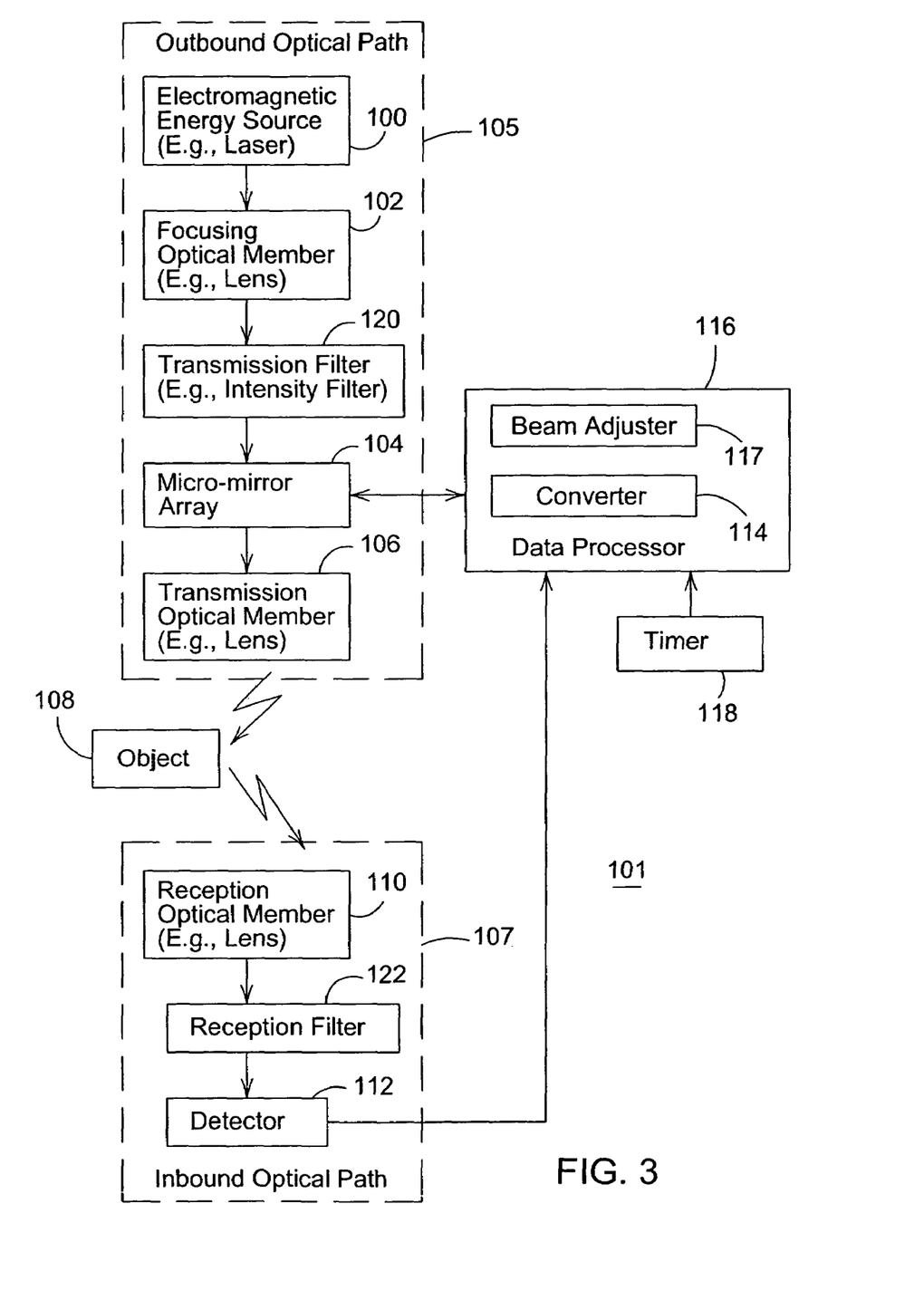
FIG. 3 is a block diagram of another embodiment of an optical range finder for estimating or determining a distance of an object from a reference point.

FIG. 3 is a block diagram of an alternate embodiment of a range finder. The range finder 101 of FIG. 3 is similar to the range finder 99 of FIG. 1, except the range finder 101 of FIG. 3 further includes a transmission filter 120 and a reception filter 122. Like elements in FIG. 1 and FIG. 3 indicate like elements.

The optical range finder 101 comprises an outbound optical path 105 and an inbound optical path 107. The outbound optical path 105 is associated with an electromagnetic signal (e.g., a pulse or pulse train) transmitted from the range finder 101 toward an object 108, whereas the inbound optical path 107 is associated with the reflected electromagnetic signal received by the range finder 101. The outbound optical path 105 comprises an electromagnetic energy source 100, a focusing optical member 102, a transmission filter 120, a micro-mirror array 104, and a transmission optical member 106. The inbound optical path 107 comprises a reception optical member 110, a reception filter 122, and a detector 112.

In one embodiment, the transmission filter 120 comprises an intensity filter. For example, the intensity filter may represent a liquid crystal display or a rotatable disk with various selectable levels of transparency. The transmission filter may attenuate the transmitted electromagnetic radiation to maintain eye-safe output levels of the transmitted electromagnetic radiation from the outbound optical path. The intensity filter may attenuate the transmitted electromagnetic radiation from the electromagnetic energy source 100 to limit the maximum distance from which a return signal may be detected. Accordingly, the intensity filter may be used to automatically filter out objects 108 from outside a certain range of interest. It would also allow the scanning rate to be increased, since the time per acquired data point is limited by the maximum mean round-trip time to the most distance object 108 that may generate a return. The transmission filter 120 might also be placed between the micro-mirror array 104 and the transmission optical member 106, but in the location shown, the micro-mirror array 104 is saved from extra heat from the full electromagnetic radiation generated by the source incident on it.

In another embodiment, the transmission filter 120 comprises a frequency-selective filter for passing or rejecting a particular frequency of electromagnetic radiation. For example, the filter 120 may be configured to block or pass green light, red light or blue light or other colors. By changing from one filter 120 to another with a different frequency response and detecting the amplitude of the reflected signals, the data processor can estimate an approximate color of an object 108.

Figure 4:
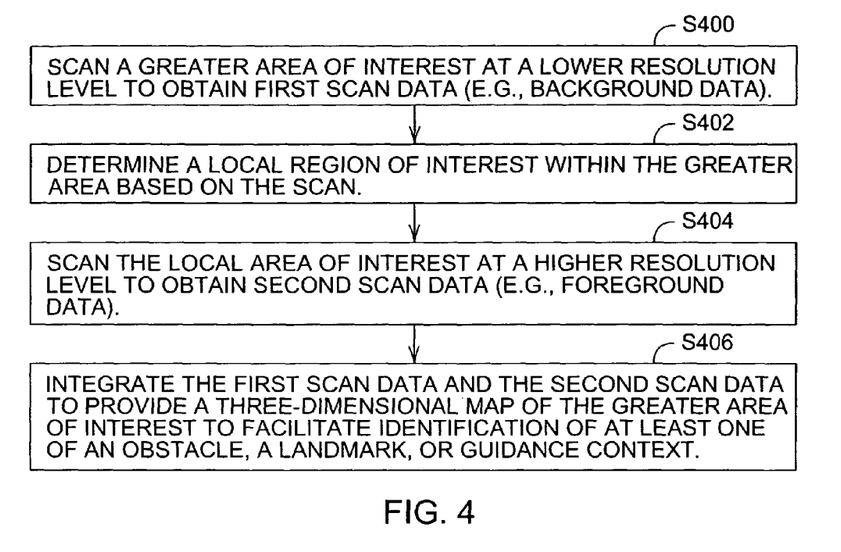
FIG. 4 is a method for adjusting the beam size of a defined radiation pattern to enhance resolution of the optical range finder.

FIG. 4 is a flow chart of a method of determining whether to use a high resolution scan or a low resolution scan. The method of FIG. 4 may be applied to carry out step S204 of FIG. 2. The method of FIG. 4 begins in step S400.

In step S400, a greater area of interest is scanned at a lower resolution level to obtain first scan data. The first scan data may include background data, foreground data, or both. The data processor may not have adequate information available from the first scan data to completely discriminate between background data and foreground data in the first scan data. A foreground object is located in front of a background object and is closer to the range finder (e.g., 99 or 101).

In step S402, a local region of interest is determined within the greater area based on the first scan data. The first scan data may detect one or more objects (e.g., 108) or potential objects at multiple distances in a global scan region. To ascertain or verify the presence and location of objects, the transmitted beam size (e.g., width) is reduced to a smaller beam size.

In one embodiment, the local region of interest represents one or more regions where foreground objects were potentially detected. In one example, the directed attention of this invention is particularly well-suited for the forest domain where trees as the background objects may need to be detected through the foreground brush. The foreground brush may represent one or more foreground objects.

If no foreground object is present or potentially present, the local region of interest may represent a portion of the background object or a discontinuity region between one or more background objects. A discontinuity may represent a material change in the amplitude of the received electromagnetic radiation or reflection. Further, the discontinuity may represent a change in amplitude for a particular frequency (e.g., green light) or frequency band of the received electromagnetic radiation. For example, a global area of interest represents a crop edge and a discontinuity therein represents a local area of interest. The crop edge may reflect a first frequency of light, whereas a discontinuity does not reflect the first frequency of light or reflects a second frequency of light, distinct from the first frequency.

In step S404, a local area of interest is scanned at a higher resolution level to obtain second scan data (e.g., foreground data). For example, the data processor 116 or beam adjuster 117 may direct the attention of the beam via a higher resolution scan with a narrower beam size (e.g., over a local area of interest), based on the return signal from a wider beam pulse or modulated signal of the first scan. If the environment permits, the second scan or higher resolution scan supports distinguishing background objects from foreground objects of lesser physical size than that lower resolution scan does. In addition, the higher resolution supports separating objects based on the higher resolution.

Step S404 may be carried out in a variety of ways. For example, the beam adjuster 117 may automatically reduce the beam size by selective energization of the micro-mirror array 104 to focus the transmitted electromagnetic beam from the range finder 101 over a global area of interest or a local area of interest at the higher resolution. The micro-mirror array 104 supports random access scanning and on-the-fly beam size adjustment transmitted from the range finder (e.g., 99 or 101). The resolution adjustment supports first scanning an entire global region at a lower resolution and secondly scanning a local region of interest at a higher resolution. No mechanical lens adjustment is required and no alignment of the rotating mirrors through a complete movement range is required as in the prior art.

In step S406, the first scan data is integrated with the second scan data to provide a two or three-dimensional map of the greater area of interest to facilitate identification of at least one of an obstacle, a landmark or guidance context. The two or three-dimensional map may be used to construct a path plan for a vehicle (e.g., an autonomous or unmanned vehicle).

In FIG. 4, the decision of whether to use a narrower beam with greater resolution versus a larger beam with lesser resolution may depend upon whether or not the greater resolution provides any extra information. If the narrower beam were used at all times, the amount of data collected would increase. In turn, the data processing and storage capacity associated with the data processor 16 would need to be configured to support the quantity of the collected data. The time to obtain data from the global field of interest would also increase because the collected data would likely pertain to other areas outside of the local field of interest.

Figure 5:
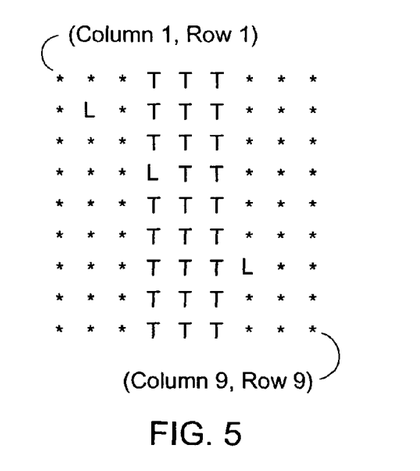
FIG. 5 is an illustrative example of a first image pattern detected by a range finder.
Figure 6:
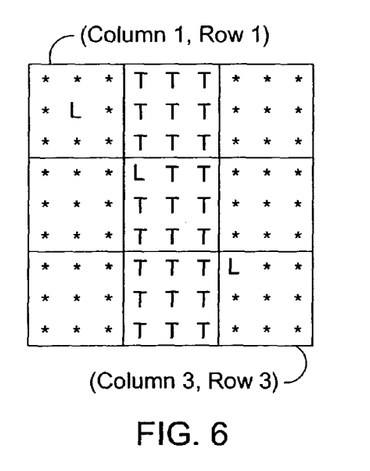
FIG. 6 is an illustrative example of a second image pattern detected by a range finder.

FIG. 5 represents an illustration of first scan data, whereas FIG. 6 represents an illustration of second scan data. The first scan data may represent image data in a rectangular region (e.g., 9 inches by 9 inches in the real world), expressed in columns and rows. The first scan data may be captured by a larger beam size (e.g., 3 inches by 3 inches), whereas the second scan data may be captured by a smaller beam size (e.g., 1 inch by 1 inch). As illustrated in FIG. 5, the first scan data contains a large background object and one or more small foreground objects within a global region of interest. For example, the large background object may comprise a tree trunk, whereas the foreground objects may comprise one or more leaves.

The rectangular region of the first scan data of FIG. 5 may be divided into a grid or a cellular arrangement with elements identified by row and column coordinates. As illustrated, there are nine rows and nine columns, although in practice, virtually any number of rows and columns could be present. Suppose that there are leaves (L) with coordinates and ranges, respectively, as follows: (column two, row two) at approximately 20 feet from the range finder; (column four, row four) at approximately 20.3 feet from the range finder, which occludes the tree trunk; and (column seven, row seven) at approximately 20.6 feet from the range finder. Further, there is a tree trunk (T) at columns 4–6 at approximately 21 feet from the range finder. Each of the leaves or trunk portions shown in FIG. 5 is of sufficient physical size and reflectivity to provide enough reflectance to register a sufficient return signal by the range finder to indicate the presence of an object.

Initially in one illustrative example, the data processor 116 or the beam adjuster 117 of the range finder (99 or 101) is set on a large beam size (e.g., a rectangular 9 inch beam) or a low resolution mode for a general region of interest at approximately 20 to 21 feet from the range finder. In the lower resolution mode, the range finder may provide a first return of a leaf at row 2, column 2, at approximately 20 feet, the last return from the trunk at approximately 21 feet or both. The small foreground objects in front of the trunk may not be recognized by the range finder. Further, the range finder may not be able to distinguish between the small foreground object and the background object.

FIG. 6 represents the case where the background object or a portion thereof is identified within a local field of interest. The local field of interest of FIG. 6 represents one box or one row-column combination in FIG. 6. There are nine potential local fields of interest of FIG. 9, which may be selected from three rows and three columns, although virtually any number of rows and columns may be used. The range finder may be set on a smaller beam width (e.g., rectangular 1 inch by 1 inch) with a higher resolution to obtain the second scan data in the local field of interest. The return signal is resolved on a time-of-flight time basis so that within the smaller beam width or higher resolution, objects are detected at approximately 20 feet from the range finder, at approximately 20.3 feet from the range finder, 20.6 feet from the range finder, and 21 feet from the range finder. Leaves are detected in column one, row one, column two, row two, and column three, row three. The tree trunk is detected in column two, rows one through three, inclusive.

Figure 7:
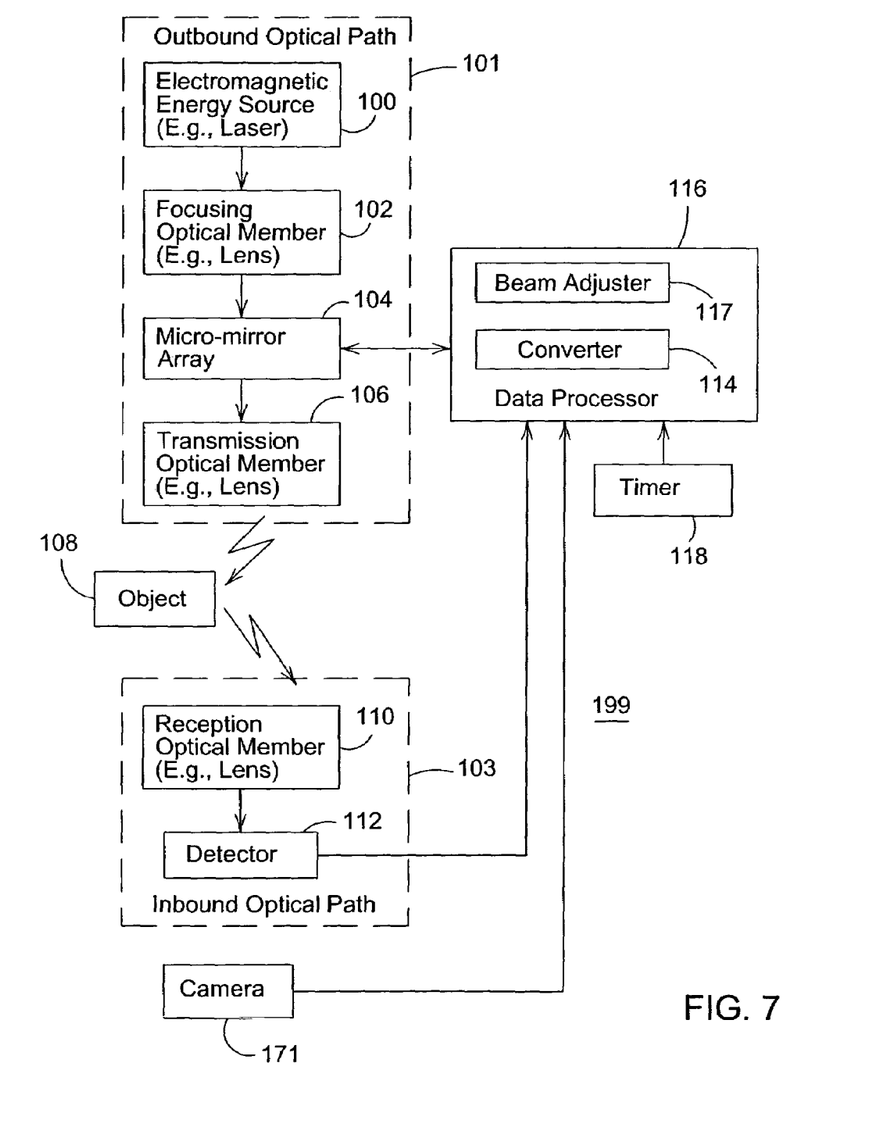
FIG. 7 is an alternate embodiment of an optical range finder.

FIG. 7 illustrates an alternate embodiment of the range finder 199. The range finder of FIG. 7 is similar to the range finder 99 of FIG. 1, except the range finder 199 of FIG. 7 further includes an optical camera 171. The optical camera 171 may be used to identify regions of like color that may correspond to surfaces at given distances. Although a color camera may provide an output of a color signal, which includes a red component, a green component, and a blue component, in an alternate embodiment the color camera may provide a near infra-red component or signal instead of, or in addition to, the red component, the green component and the blue component. The color signal may provide an intensity value of pixels or groups of pixels for each corresponding red component, green component, and blue component for the area scanned. In the example above, suppose that the leaves are green, the trunk is brown, and background is sky blue. If the optical camera 171 and laser beam were calibrated and coordinated, the processing of the camera image by the data processor 119 would show two blue regions on each side of the trunk, three green regions where the leaves were, and the brown region where the trunk is. These regions identified in the camera image could be used as first guesses of where the multiple ranges in the larger rectangular beam width could be resolved.

Having described the preferred embodiment, it will become apparent that various modifications can be made without departing from the scope of the invention as defined in the accompanying claims.

What is claimed is:

1. An optical device for measuring a distance between the optical device and an object, the optical device comprising:
   an optical source for emitting a beam of electromagnetic radiation;
   a focusing optical member for focusing the beam of electromagnetic radiation into a micro-mirror incident pattern;
   a micro-mirror array receiving the micro-mirror incident pattern and outputting a controlled radiation pattern;
   a processor for selecting a resolution level of the controlled radiation pattern based on a previous lower resolution scan over a greater area; and
   a transmission optical member for focusing the controlled radiation pattern toward an object for estimation of a distance of the object from the optical device, where a first scan is directed to a background object and a potential foreground object and wherein a second scan is directed at the potential foreground object to verify the presence or absence of the potential foreground object.

2. The optical device according to claim 1 wherein the micro-mirror array comprises a microelectromechanical system.

3. The optical device according to claim 1 wherein the micro-mirror array comprises an army of deformable reflective members and a controller for controlling the deformable reflective members to direct the controlled radiation pattern.

4. The optical device according to claim 1 further comprising a beam adjuster, the beam adjuster activating successive members of the micro-mirror array prior to the time that a change in the position of the member is actually required to reduce a response time of the micro-mirror array.

5. The optical device according to claim 1 wherein the controlled radiation pattern has a beam size determined by reflective contributions from multiple reflective members of the micro-mirror array.

6. The optical device according to claim 1 wherein the optical source comprises a laser, the focusing optical member comprises a lens, and the transmission optical member comprises a lens.

7. The optical device according to claim 1 further comprising an intensity filter intercepting a path of the controlled radiation pattern for limiting the maximum distance of at least one of a global area of interest and a local area of interest.

8. The optical device according to claim 1 further comprising at least one frequency-selective filter intercepting a path of a reflection of the controlled radiation pattern from the object for filtering a reflected radiation pattern from the object to estimate an approximate color of the object.

9. The optical device according to claim 1 wherein a first scan data is directed to a global region of interest and a second scan is directed to a local region of interest, the local region of interest representing a discontinuity associated with an object, a discontinuity representing a material change in the an amplitude of a reflection of the controlled radiation pattern from the object or an absence of the reflection within a predefined vicinity of the object.

10. The optical device according to claim 9 wherein the discontinuity represents a break or interruption in a crop edge of a field.

11. The optical device according to claim 1 wherein a color camera is used to identify regions of like color that may correspond to surfaces of the object at given distances.

12. The optical device according to claim 1 further comprising
   a lens for collecting a reflection of the controlled radiation pattern from the object;
   a detector for receiving the reflection and providing an output signal to the processor; and
   a timer associated with the processor for determining an elapsed time between transmission of an identifiable pulse of electromagnetic radiation from the source and the reception of the reflection of the identifiable pulse at the sensor, the elapsed time indicative of a distance between the optical device and the object.

13. The optical device according to claim 12 wherein a filter is interposed between the lens and the sensor, the filter adapted to filter or reject at least one frequency of reflected electromagnetic radiation associated with the object.

14. A method for determining a distance of an object from a reference point, the method comprising:
   emitting electromagnetic radiation;

focusing the electromagnetic radiation upon a micro-mirror array;

directing the focused electromagnetic radiation in a defined direction or defined radiation pattern toward an object, consistent with a lower resolution scan over a greater area or a higher resolution scan over a lesser area of interest based on a previous lower resolution scan over the greater area; and receiving electromagnetic radiation reflected from the object;

detecting the receipt of the reflected electromagnetic radiation;

determining an elapsed time between transmission of the electromagnetic radiation to the object and receipt of the electromagnetic radiation from the object;

converting the elapsed time into a distance between the object and the reference point;

directing the lower resolution scan to a background object and a potential foreground object; and directing the higher resolution scan at the potential foreground object to verify the presence or absence of the potential foreground object at a particular spatial position.

15. The method according to claim 14 further comprising:

filtering the emitted electromagnetic radiation received to control the intensity range of the focused electromagnetic radiation upon the micro-mirror array.

16. The method according to claim 14 further comprising:

filtering the reflected electromagnetic radiation received to control the intensity range of incident electromagnetic radiation upon the detector.

17. The method according to claim 14 further comprising:

filtering the reflected electromagnetic radiation from an object in a frequency-selective manner to estimate an approximate color of the object.

18. The method according to claim 14 further comprising identifying regions of like color that may correspond to surfaces of the object at given distances.

19. The method according to claim 14 further comprising:

processing at least one of a red component, a green component, a blue component, and a near infrared component to determine a color of the object.

* * * * *